US012597376B1

(12) United States Patent
Soriano et al.

(10) Patent No.: US 12,597,376 B1
(45) Date of Patent: Apr. 7, 2026

(54) AUTOMATED COLOR CALIBRATION OF DISPLAY DEVICES

(71) Applicant: Disney Enterprises, Inc., Burbank, CA (US)

(72) Inventors: Paola Soriano, Winter Park, FL (US); Joseph Kadin, Burbank, CA (US); Adam Galloway, Winter Garden, FL (US); Adam Hendershot, Titusville, FL (US); Clarissa J. Matalone, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 18/954,354

(22) Filed: Nov. 20, 2024

(51) Int. Cl.
*G09G 3/20* (2006.01)

(52) U.S. Cl.
CPC ... *G09G 3/2003* (2013.01); *G09G 2320/0666* (2013.01); *G09G 2320/0693* (2013.01); *G09G 2354/00* (2013.01); *G09G 2370/022* (2013.01); *G09G 2370/06* (2013.01); *G09G 2370/16* (2013.01)

(58) Field of Classification Search
CPC ......... G09G 3/2003; G09G 2320/0666; G09G 2320/0693; G09G 2354/00; G09G 2370/022; G09G 2370/06; G09G 2370/16
See application file for complete search history.

(56) References Cited

U.S. PATENT DOCUMENTS

| | | | | |
|---|---|---|---|---|
| 7,061,547 | B2 | 6/2006 | Wada | |
| 7,113,315 | B2 | 9/2006 | Frick et al. | |
| 8,791,999 | B2 | 7/2014 | Marcu | |
| 9,513,169 | B2 * | 12/2016 | Ohnishi | G09G 3/006 |
| 10,038,884 | B2 | 7/2018 | Holub | |
| 10,911,748 | B1 | 2/2021 | Molholm et al. | |
| 2015/0243251 | A1 * | 8/2015 | Ohnishi | G06F 3/1446 345/690 |
| 2021/0352270 | A1 * | 11/2021 | Bodner | G01J 3/0264 |

FOREIGN PATENT DOCUMENTS

| | | |
|---|---|---|
| CN | 101738813 B | 12/2014 |

OTHER PUBLICATIONS

"X-Rite Display Colorimeters" X-Rite, Incorporated 2024 7 Pages.

* cited by examiner

*Primary Examiner* — Pegeman Karimi
(74) *Attorney, Agent, or Firm* — Farjami & Farjami LLP

(57) ABSTRACT

A system includes a computing platform having a hardware processor and a memory storing software code, and a calibration device and one or more display devices each communicatively coupled to the computing platform. The hardware processor executes the software code to receive user selection data identifying a color standard, receive first display device selection data identifying a first display device of the one or more display devices, and calibrate, using the calibration device, the first display device to conform the first display device to the color standard.

20 Claims, 5 Drawing Sheets

AUTOMATED COLOR CALIBRATION OF DISPLAY DEVICES

BACKGROUND

Capturing and applying color measurement values for use in calibrating display devices such as projectors and display screens is typically a tedious process that requires displaying solid colors using a display device, taking readings from a calibration device, adjusting the readings to match a relative range and then applying the adjusted values back to the display device. These steps have traditionally been performed manually.

In the case of calibrating projectors, for example, a projectionist would use an infrared (IR) remote control or projector settings software to individually select a color to be measured on a projector. Readings from a colorimeter would then be taken, typically using separate software, and adjustments for the color space would be manually calculated. Then, using an IR remote control or projector settings software, the updated values for a particular color would be entered into the projector settings. This process would then need to be manually repeated for each different color for the same projector, and that entire process for multiple colors would need to be manually performed separately for each projector being color calibrated. This conventional procedure is undesirably time consuming and error prone.

DETAILED DESCRIPTION

Figure 1:
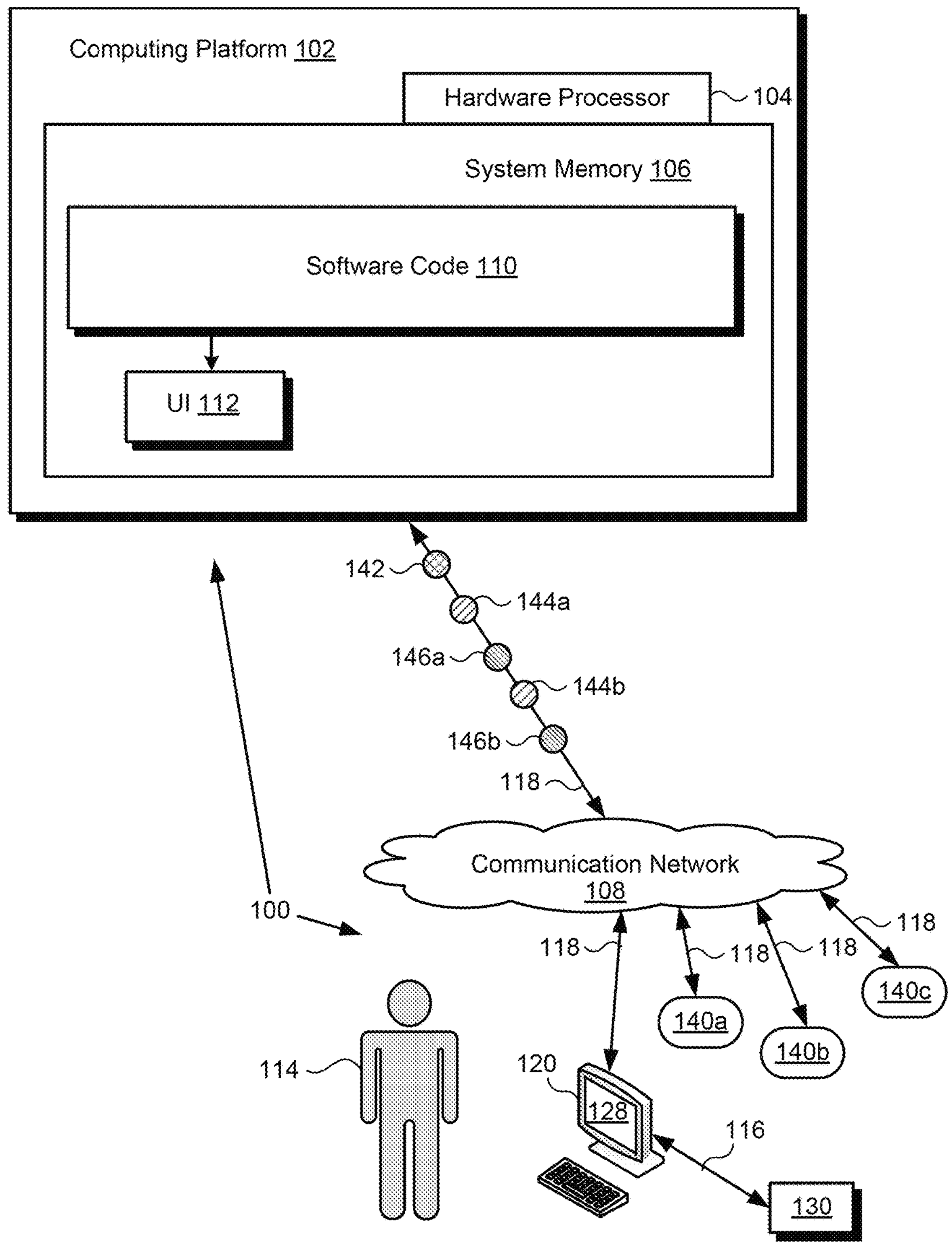
FIG. 1 shows an exemplary system for performing automated color calibration of display devices, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, capturing and applying color measurement values for use in calibrating display devices such as projectors and display screens is typically a tedious process that requires displaying solid colors using a display device, taking readings from a calibration device, adjusting the readings to match a relative range and then applying the adjusted values back to the display device. These steps have traditionally been performed manually and are both time consuming and error prone.

In the case of calibrating projectors, for example, as noted above, a projectionist would use an infrared (IR) remote control or projector settings software to individually select a color to be measured on a projector. Readings from a colorimeter would then be taken, typically using separate software, and adjustments for the color space would be manually calculated. Then, using an IR remote control or projector settings software, the updated values for a color would be entered into the projector settings. This process would then need to be manually repeated for each different color for the same projector, and that entire process for multiple colors would need to be manually performed separately for each projector being color calibrated. This conventional procedure can take as much as two hours to perform when calibrating a group of five projectors, for example.

The present application discloses an automated color calibration solution for display devices that addresses and overcomes the drawbacks and deficiencies in the conventional art. The novel and inventive systems and methods disclosed in the present application advance the state-of-the-art by introducing a color calibration solution that automates calibration value capture for multiple colors and tunes the settings of the display device using those calibration values in a process that enables color calibrating multiple display devices together so as to accurately conform to the same color standard. In the specific use case of color calibrating five projectors to the same color standard, for example, in contrast to the conventional procedure requiring up to two hours to be performed, the automated color calibration solution disclosed in the present application can be completed in as little as five to fifteen minutes.

It is noted that, as defined in the present application, the terms “automation,” “automated” and “automating” refer to systems and processes that do not require the intervention of a human system operator. Although, in some implementations, a system operator may review, ratify, or adjust the calibration values captured by the automated systems and according to the automated methods described herein, that human involvement is optional. Thus, the methods described in the present application may be performed under the control of the hardware processing components of the disclosed automated systems.

FIG. 1 shows exemplary system 100 for performing automated color calibration of display devices, according to one implementation. As shown in FIG. 1, system 100 includes computing platform 102 having hardware processor 104 and system memory 106 implemented as a computer-readable non-transitory storage medium. As further shown in FIG. 1, system memory 106 stores software code 110 providing user interface (UI) 112. In addition, according to the exemplary implementation shown in FIG. 1, system 100 additionally includes user system 120 having display 128, calibration device 130 and one or more display devices 140*a*, 140*b* and 140*c* (hereinafter “display device(s) 140*a*/140*b*/140*c*”).

As also shown in FIG. 1, system 100 is implemented within a use environment including communication network 108 and network communication links 118. It is noted that in the exemplary implementation shown in FIG. 1 calibration device 130 is a peripheral device of user system 120, communicatively coupled to user system 120 via communication link 116, which may be a wired or wireless communication link. It is further noted that user system 120 and each of display device(s) 140*a*/140*b*/140*c* are communicatively coupled to computing platform 102 remote from user system 120 and display device(s) 140*a*/140*b*/140*c* via communication network 108 and network communication links 118. Thus, in some implementations, calibration device 130 may be communicatively coupled to computing platform 102 of system 100 via user system 120 and network communication links 118 of communication network 108. Also shown in FIG. 1 are user 114 of system 100, user selection data 142, first display device selection data 144*a*, first calibration data 146*a*, second display device selection data 144*b* and second calibration data 146*b*.

It is noted that although FIG. 1 depicts system 100 as including three display devices 140*a*, 140*b* and140*c*, that representation is merely provided in the interest of conceptual clarity. In various implementations, system 100 may include as few as one display device, two display devices, or more than three display devices. Moreover, in various implementations, display device(s) 140*a*/140*b*/140*c* may correspond to a variety of different types of display devices. Examples of such display device types include projection devices such as video and still image projectors, display screens such as monitors, and display panels of a light wall, such as a light-emitting diode (LED) panel of an LED light wall, to name a few.

Although the present application refers to software code 110 as being stored in system memory 106 for conceptual clarity, more generally, system memory 106 may take the form of any computer-readable non-transitory storage medium. The expression "computer-readable non-transitory storage medium," as defined in the present application, refers to any medium, excluding a carrier wave or other transitory signal, that provides instructions to hardware processor 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, internal and external hard drives, optical discs, RAM, programmable read-only memory (PROM), erasable PROM (EPROM) and FLASH memory.

Moreover, in some implementations, system 100 may utilize a decentralized secure digital ledger in addition to system memory 106. Examples of such decentralized secure digital ledgers may include a blockchain, hashgraph, directed acyclic graph (DAG), and HOLOCHAIN® ledger, to name a few. In use cases in which the decentralized secure digital ledger is a blockchain ledger, it may be advantageous or desirable for the decentralized secure digital ledger to utilize a consensus mechanism having a proof-of-stake (PoS) protocol, rather than the more energy intensive proof-of-work (PoW) protocol.

Although FIG. 1 depicts software code 110 as being located in its entirety in a single instantiation of system memory 106, that representation is also provided merely as an aid to conceptual clarity. More generally, system 100 may include one or more computing platforms 102, such as computer servers for example, which may be co-located, or may form an interactively linked but distributed system, such as a cloud-based system, for instance. As a result, hardware processor 104 and system memory 106 may correspond to distributed processor and memory resources within system 100. Consequently, in some implementations, software modules included as components of software code 110 may be stored remotely from one another on the distributed memory resources of system 100.

Hardware processor 104 may include multiple hardware processing units, such as one or more central processing units, one or more graphics processing units, and one or more tensor processing units, one or more field-programmable gate arrays (FPGAs), custom hardware for machine learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence processes such as machine learning modeling.

In some implementations, computing platform 102 may include one or more web servers, accessible over a packet-switched network such as the Internet, for example. Alternatively, computing platform 102 may include one or more computer servers supporting a private wide area network (WAN), local area network (LAN), or included in another type of limited distribution or private network. In addition, or alternatively, in some implementations, system 100 may utilize a local area broadcast method, such as User Datagram Protocol (UDP) or Bluetooth®, for instance to communicate with user system 120 and display device(s) 140*a*/140*b*/140*c*. Furthermore, in some implementations, system 100 may be implemented virtually, such as in a data center. For example, in some implementations, system 100 may be implemented in software, or as virtual machines. Moreover, in some implementations, system 100 may be configured to communicate via a high-speed network suitable for high performance computing (HPC). Thus, in some implementations, communication network 108 may be or include a 10. GigE network or an Infiniband network, for example.

It is noted that, although user system 120 is shown as a desktop computer in FIG. 1, that representation is provided merely by way of example. In other implementations, user system 120 may take the form of any suitable mobile or stationary computing device or system that implements data processing capabilities sufficient to support UI 112, as well as connections to communication network 108, and perform the functionality ascribed to user system 120 herein. That is to say, in other implementations, user system 120 may take the form of a laptop computer, tablet computer, or smartphone, to name a few examples. Alternatively, in some implementations, user system 120 may be a "dumb terminal" peripheral device of system 100. In those implementations, user system 120 may be controlled by hardware processor 104 of computing platform 102.

It is also noted that display 128 of user system 120 may take the form of a liquid crystal display (LCD), an LED display, an organic light-emitting diode (OLED) display, a quantum dot (QD) display, or any other suitable display screen that perform a physical transformation of signals to light. Furthermore, display 128 may be physically integrated with user system 120 or may be communicatively coupled to but physically separate from user system 120. For example, where user system 120 is implemented as a smartphone, laptop computer, or tablet computer, display 128 will typically be integrated with user system 120. By contrast, where user system 120 is implemented as a desktop computer, display 128 may take the form of a monitor separate from user system 120 in the form of a computer tower.

Figure 2:
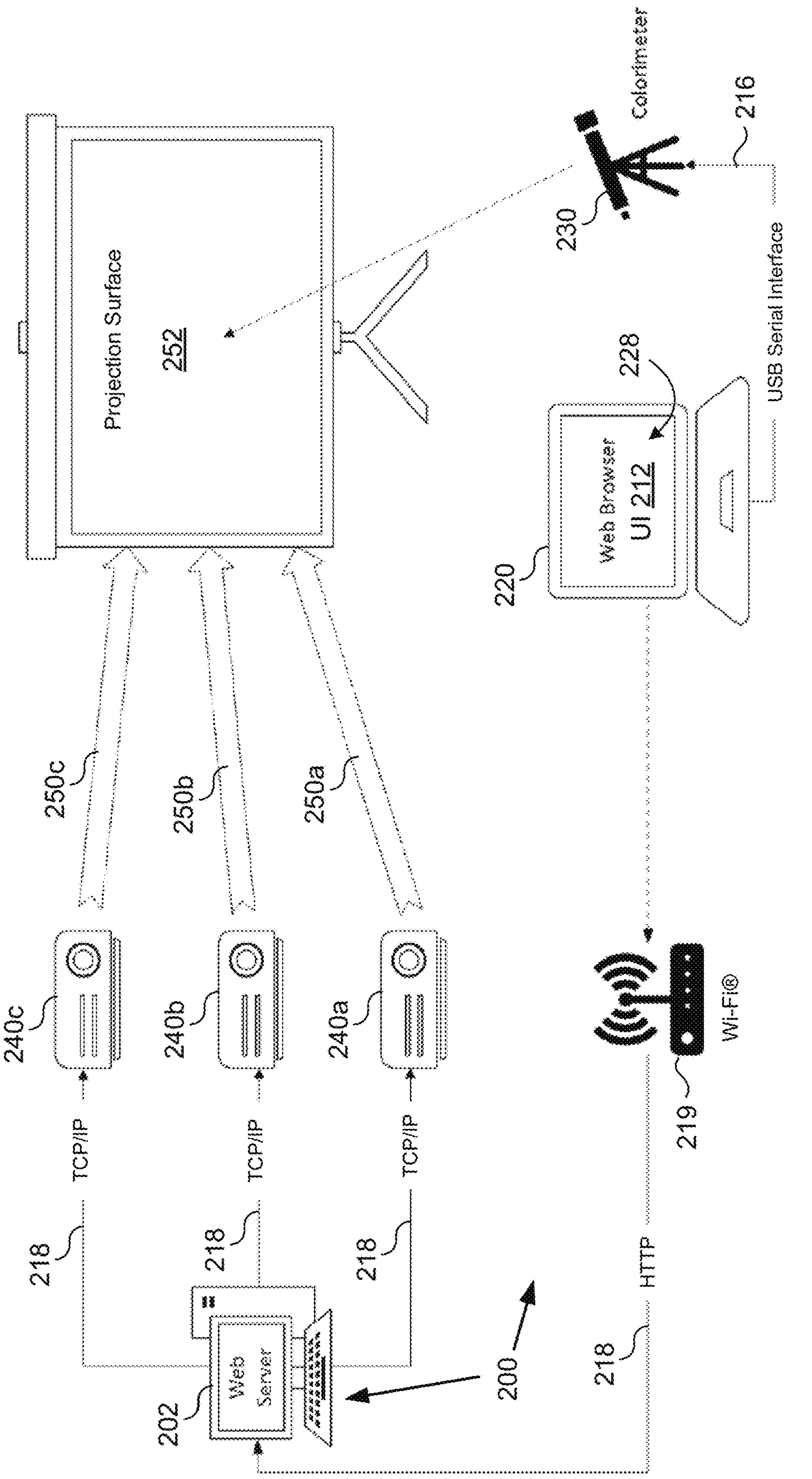
FIG. 2 illustrates use of the system of FIG. 1 for performing automated color calibration of display devices, according to one implementation.

FIG. 2 illustrates use of system 200, corresponding to system 100 in FIG. 1, for performing automated color calibration of display devices, according to one implementation. As shown in FIG. 2, system 200 includes computing platform 202 in the form of a web server remote from user system 220 presenting web browser based UI 212 on display 228, and also remote from one or more display devices 240*a*, 240*b* and 240*c* (hereinafter "display device(s) 240*a*/240*b*/240*c*"). It is noted that an advantage of utilizing web browser based UI 212 is that a web browser based UI does not require a specific type of host device or operating system to use, and can be used on mobile devices as well. Thus, according to the exemplary implementation shown in FIG. 2, web server computing platform 202 is connected to a network that can access all display device(s) 240*a*/240*b*/240*c*, while user system 220 can be a laptop computer, tablet computer, or smartphone, for example that does not need to be part of the same network as display device(s) 240*a*/240*b*/240*c*.

System 200 also includes calibration device 230 shown as an exemplary colorimeter implemented as a peripheral device of user system 220 and communicatively coupled to user system 220 via communication link 216 in the form of an exemplary wired Universal Serial Bus (USB) interface. It is noted that although calibration device 230 is shown as a colorimeter in FIG. 2, that representation is merely provided by way of example. In other implementations, calibration device 230 may take the form of a spectroradiometer. It is further noted that an advantage of implementing calibration device 230 as a peripheral device of user system 220 is that by being connected to user system 220, calibration device 230 does not require a connection to web server computing platform 202. Analogously to the advantage of having UI 212 be web browser based, this allows much easier maintenance and calibration by allowing all of the user-facing components of system 200 to be portable.

Also shown in FIG. 2 are one or more projections 250*a*, 250*b* and 250*c* produced successively and in any order by respective display device(s) 240*a*/240*b*/240*c* in the form of exemplary projectors, projection surface 252 receiving one or more projections 250*a*, 250*b* and 250*c*, and network communication links 218 in the form of Transmission Control Protocol/Internet Protocol (TCP/IP) links communicatively coupling display device(s) 240*a*/240*b*/240*c* to remote computing platform 202 of system 200, and Hypertext Transfer Protocol (HTTP) link communicatively coupling user system 220 to remote computing platform 202 of system 200 via exemplary Wireless Fidelity (Wi-Fi®) router 219. Utilizing widely used TCP/IP and HTTP links rather than specialty wiring or customized network connections advantageously lowers cost and complexity by enabling the use of the display control architecture that is typically already in place for display device(s) 240*a*/240*b*/240*c*.

It is noted that computing platform 202, user system 220, UI 212, calibration device 230, display device(s) 240*a*/240*b*/240*c*, communication link 216 and network communication links 218 correspond respectively in general to computing platform 102, user system 120, UI 112, calibration device 130, display device(s) 140*a*/140*b*/140*c*, communication link 116 and network communication links 118, in FIG. 1. Consequently, computing platform 202, user system 220, UI 212, calibration device 230, display device(s) 240*a*/240*b*/240*c*, communication link 216 and network communication links 218 may share any of the characteristics attributed to respective computing platform 102, user system 120, UI 112, calibration device 130, display device(s) 140*a*/140*b*/140*c*, communication link 116 and network communication links 118 by the present disclosure, and vice versa. For example, like display 128, display 228 may take the form of an LCD, LED display, OLED display, or QD display. Moreover, although not shown in FIG. 2, computing platform 202 includes features corresponding respectively to hardware processor 104 and system memory 106 storing software code 110.

It is further noted that although display device(s) 240*a*/240*b*/240*c* are depicted as projectors in the implementation shown in FIG. 2, that representation is provided merely by way of example. In other implementations, display device(s) 240*a*/240*b*/240*c* may correspond to a variety of different types of display devices. Examples of such display device types include projection devices such as video and still image projectors, display screens such as monitors, and display panels of a light wall, such as an LED panel of an LED light wall, to name a few.

Referring to FIGS. 1 and 2 in combination, user 114 may utilize UI 112/212 to input user selection data 142 into user system 120/220 to identify a color standard for color calibration of display device(s) 140*a*/140*b*/140*c*/240*a*/240*b*/240*c* (hereinafter also "projector(s) 240*a*/240*b*/240*c*"). Color standards selectable by user 114 may include an industry standard such as any of Rec.709, Rec.601, Rec.2020, Rec.2100, or sRGB, for example. Alternatively, where display device(s) 140*a*/140*b*/140*c*/240*a*/240*b*/240*c* include multiple display devices, the color standard selectable by user 114 may be specific to those display devices, for example a range of colors common to those display devices, thereby ensuring those display devices appear consistent while optimizing for the unique characteristics of each display device. Moreover, in some implementations, brightness readings may be used to calibrate display devices not just by color, but also by total light output, which may impact overall visual continuity.

User 114 may then utilize UI 112/212 to input first display device selection data 144*a* into user system 120/220 to identify one of projector(s) 240*a*/240*b*/240*c*, e.g., projector 240*a*, for color calibration. User 114 ensures that calibration device 130/230 (hereinafter also "colorimeter 230", as an example), is aimed at projection surface 252 and uses colorimeter 230 to collect first calibration data 146*a* based on projection 250*a* produced by projector 240*a*.

User selection data 142, first display device selection data 144*a* and first calibration data 146*a* may be transmitted to computing platform 102/202 of system 100/200, either (i) as first display device selection data 144*a* and first calibration data 146*a* are input to user system 120/220, or (ii) subsequent to first calibration data 146*a* being input to user system 120/220. Software code 110 may then be executed by hardware processor 104 of computing platform 102/202 to calibrate projector 240*a* based on first calibration data 146*a* collected using colorimeter 230, to conform projector 240*a* to the color standard identified by user selection data 142.

Analogously, second display device selection data 144*b* may be input to user system 120/220 for color calibrating projector 240*b* and second calibration data 146*b* may be received from colorimeter 230. Software code 110 may then be executed by hardware processor 104 of computing platform 102/202 to calibrate projector 240*b* based on second calibration data 146*b* collected using colorimeter 230, to conform to the color standard identified by user selection data 142, i.e., the same color standard used for calibration of projector 240*a*. This process may be repeated for projector 240*c* and so forth, until each of projector(s) 240*a*/240*b*/240*c* is color calibrated to conform to the same color standard.

Figure 3:
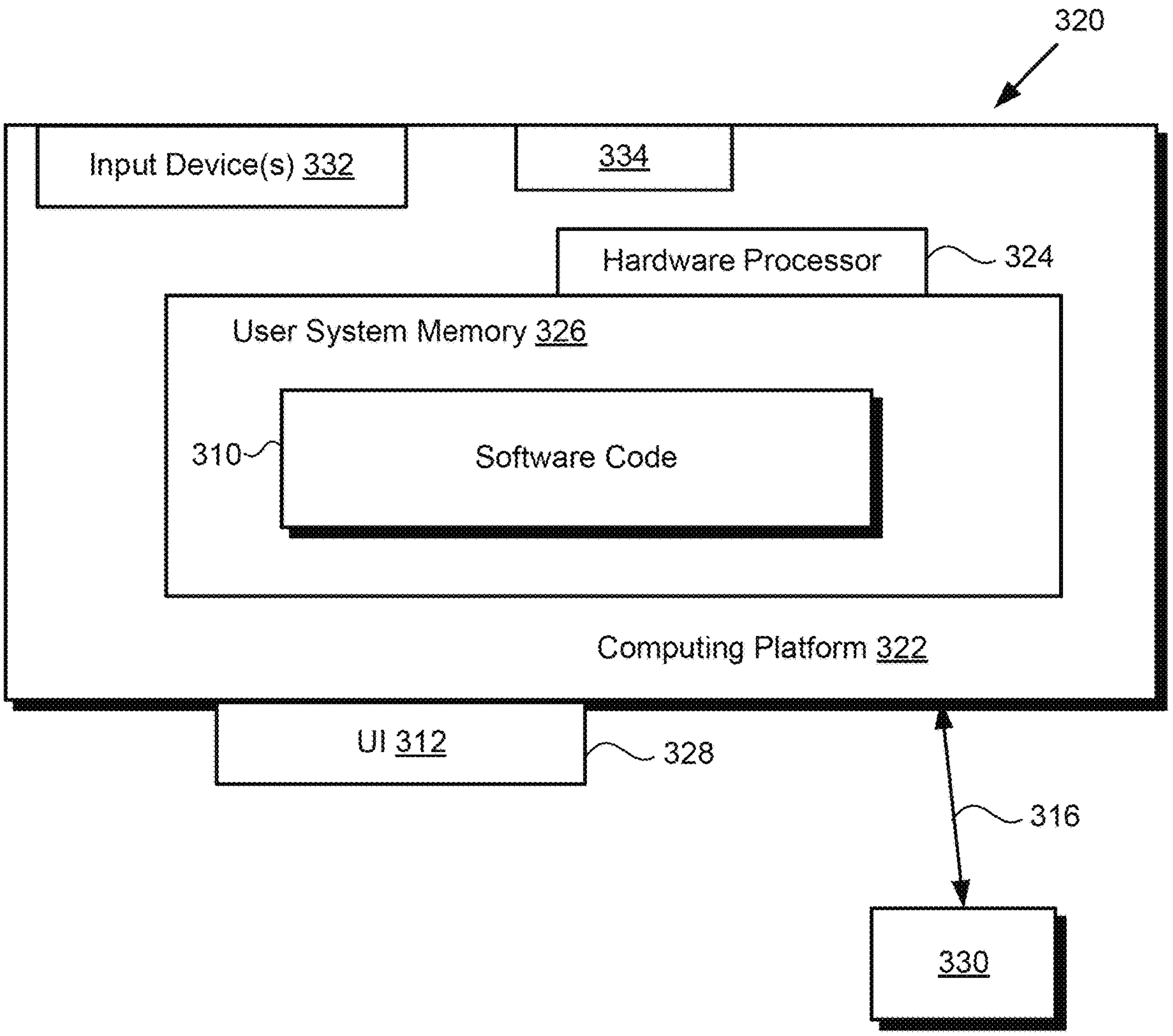
FIG. 3 show another exemplary system for performing automated color calibration of display devices, according to one implementation.

FIG. 3 shows another exemplary system, i.e., user system 320, for performing automated color calibration of display devices, according to one implementation. As shown in FIG. 3, user system 320 includes user system computing platform 322 having one or more input devices 332 (hereinafter "input device(s) 332), transceiver 334, hardware processor 324, display 328 presenting UI 312, and user system memory 326 implemented as a computer-readable non-transitory storage medium storing software code 310. Also included as a peripheral component of user system 320 is calibration device 330 communicatively coupled to user system computing platform 322 via communication link 316, which may be a wired or wireless communication link.

User system 320, display 328, UI 312, calibration device 330 and communication link 316 correspond respectively in general to user system 120/220, display 128/228, UI 112/212, calibration device 130/230 and communication link 116/216 in FIGS. 1 and 2. Thus, user system 120/220, display 128/228, UI 112/212, calibration device 130/230 and communication link 116/216 may share any of the characteristics attributed to respective user system 320, display 328, UI 312, calibration device 330 and communication links 316 by the present disclosure, and vice versa. For example, like user system 120/220, user system 320 may take the form of a desktop computer, laptop computer, tablet computer, or smartphone, for example. In addition, like display 128/228, display 328 may take the form of an LCD, LED display, OLED display, or QD display. Moreover, although not shown in FIGS. 1 and 2, user system 120/220 may include features corresponding respectively to user system computing platform 322, input device(s) 332, transceiver 334, hardware processor 324, and user system memory 326.

Input device(s) 332 may include one or more of a keyboard, mouse, trackpad, touchscreen, IR or radio-frequency receiver for reception of inputs via a remote control, or a voice activated input device (e.g., microphone), to name a few examples.

Transceiver 334 may be implemented as a wireless communication unit configured for use with one or more of a variety of wireless communication protocols. For example, transceiver 334 may include a fourth generation (4G) wireless transceiver, a 5G wireless transceiver, or 4G and 5G wireless transceivers. In addition, or alternatively, transceiver 334 may be configured for communications using one or more of Wi-Fi®, Worldwide Interoperability for Microwave Access (WiMAX®), Bluetooth®, Bluetooth® low energy (BLE), ZigBee®, radio-frequency identification (RFID), near-field communication (NFC), and 60 GHz wireless communications methods.

User system hardware processor 324 may include multiple hardware processing units, such as one or more CPUs, one or more GPUs, one or more TPUs, and one or more FPGAs, as those features are defined above.

Software code 310 corresponds in general to software code 110, in FIG. 1, and can perform all the operations attributed to software code 110 by the present disclosure. In other words, in implementations in which hardware processor 324 of user system 320 executes software code 310 stored locally in user system memory 326, user system 320 may perform any of the actions attributed to system 100 by the present disclosure. Thus, in some implementations, software code 310 executed by hardware processor 324 of user system 320 may perform automated color calibration of display devices.

Figure 4:
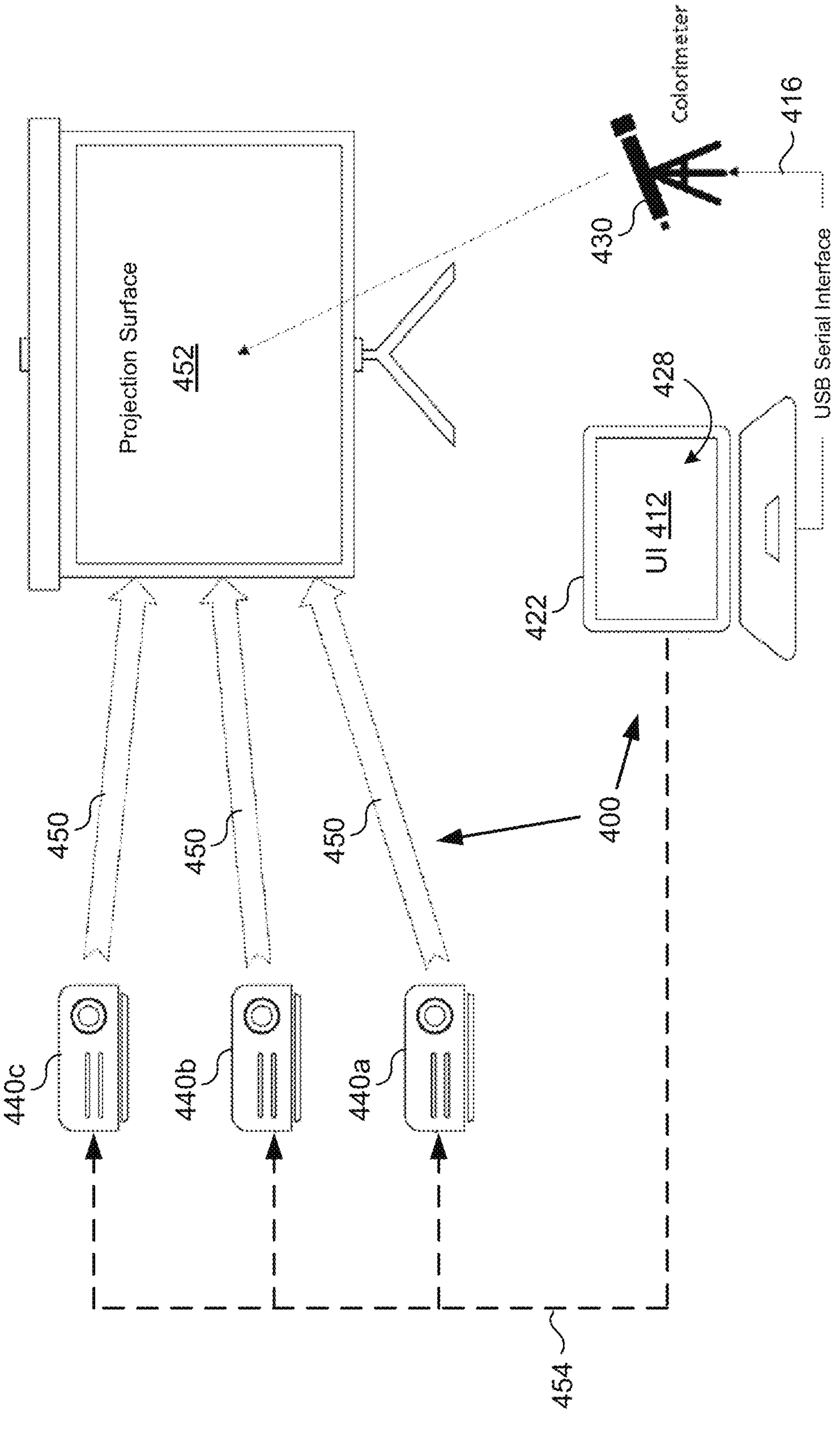
FIG. 4 illustrates use of the system of FIG. 3 for performing automated color calibration of display devices, according to one implementation.

FIG. 4 illustrates use of system 400 for performing automated color calibration of display devices, according to one implementation. As shown in FIG. 4, system 400 includes user system computing platform 422 corresponding to user system computing platform 320, in FIG. 3, and presenting UI 412 on display 428. In addition, system 400 includes calibration device 430 shown as an exemplary colorimeter implemented as a peripheral device of user system computing platform 422 and communicatively coupled to user system computing platform 422 via communication link 416 in the form of an exemplary wired USB serial interface. As further shown in FIG. 4, system 400 also includes one or more display devices 440*a*, 440*b* and 440*c* (hereinafter "display device(s) 440*a*/440*b*/440*c*") in the form of exemplary projectors. Also shown in FIG. 4 are one or more projections 450*a*, 450*b* and 450*c* produced successively and in any order by respective display device(s) 440*a*/440*b*/440*c*, projection surface 452 receiving one or more projections 450*a*, 450*b* and 450*c*, and local wireless communication links 454 communicatively coupling display device(s) 440*a*/440*b*/440*c* to user system computing platform 422.

It is noted that user system computing platform 422, display 428, UI 412, calibration device 430 and communication link 416 correspond respectively in general to user system computing platform 322, display 328, UI 312, calibration device 330 and communication link 316, in FIG. 3. Consequently, user system computing platform 422, display 428, UI 412, calibration device 430, and communication link 416 may share any of the characteristics attributed to respective user system computing platform 322, display 328, UI 312, calibration device 330 and communication link 316 by the present disclosure, and vice versa. For example, like display 328, display 428 may take the form of an LCD, LED display, OLED display, or QD display. Moreover, although not shown in FIG. 4, user system computing platform 422 further includes features corresponding respectively to input device(s) 332, transceiver 334, hardware processor 324 and system memory 326 storing software code 310.

It is further noted that although display device(s) 440*a*/440*b*/440*c* are depicted as projectors in the implementation shown in FIG. 4, that representation is provided merely by way of example. In other implementations, display device(s) 440*a*/440*b*/440*c* may correspond to a variety of different types of display devices. Examples of such display device types include projection devices such as video and still image projectors, display screens such as monitors, and display panels of a light wall, such as an LED panel of an LED light wall, to name a few.

Referring to FIGS. 1, 3 and 4 in combination user 114, may utilize UI 312/412 and input device(s) 332 to input user selection data 142 into user system computing platform 322/422 of user system 320 to identify a color standard for color calibration of display device(s) 440*a*/440*b*/440*c* (hereinafter also "projector(s) 440*a*-440*c*"). As noted above, color standards selectable by user 114 may include an industry standard such as any of Rec.709, Rec.601, Rec.2020, Rec.2100, or sRGB, for example. Alternatively, as further noted above, in use cases in which display device(s) 440*a*/440*b*/440*c* include multiple display devices, the color standard selectable by user 114 may be specific to those display devices, for example a range of colors common to those display devices, thereby ensuring those display devices appear consistent while optimizing for the unique characteristics of each display device. Moreover, and as also noted above, in some implementations, brightness readings may be used to calibrate display devices not just by color but total light output, which may impact overall visual continuity.

User 114 may then utilize UI 312/412 and input device(s) 332 to input first display device selection data **144*a* into user system computing platform 322/422 of user system 320 to identify one of projector(s) 440*a*/440*b*/440*c*, e.g., projector 440*a*, for color calibration. User 114 ensures that calibration device 430, e.g., colorimeter 430, is aimed at projection surface 452 and uses colorimeter 430 to collect calibration data for projector 440*a* based on projection 450*a* produced by projector 440*a*. Software code 310 may then be executed by hardware processor 324 of user system computing platform 322/422 to calibrate projector 440*a* based on the calibration data for projector 440*a* collected using colorimeter 430, to conform projector 440*a* to the color standard identified by user selection data 142**.

Analogously, second display device selection data **144*b* may then be received by user system computing platform 322/422 of user system 320 for color calibrating projector 440*b* and calibration data for projector 440*b* may be received from colorimeter 430. Software code 310 may then be executed by hardware processor 324 of user system computing platform 322/422 to calibrate projector 440*b* based on the calibration data for projector 440*b* collected using colorimeter 430, to conform to the color standard identified by user selection data 142, i.e., the same color standard used for calibration of projector 440*a*. And so forth for projector 440*c*, until each of projectors 440*a*/440*b*/440*c*** is color calibrated to conform to the same color standard.

Figure 5:
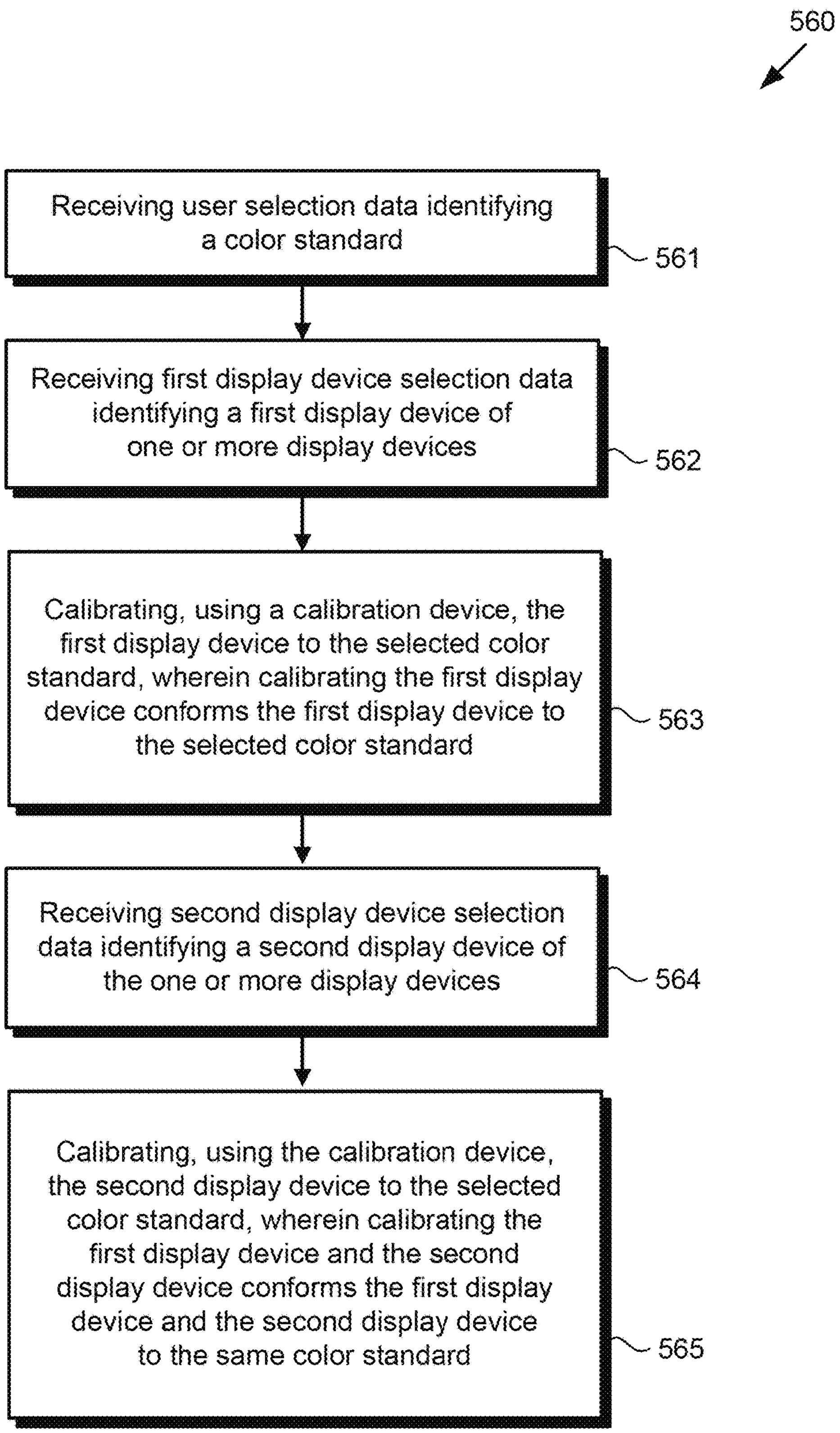
FIG. 5 shows a flowchart presenting an exemplary method for performing automated color calibration of display devices, according to one implementation.

The functionality of system 100/200, system 400 and software code 110/310 is further described below by reference to FIG. 5. FIG. 5 shows flowchart 560 presenting an exemplary method for performing automated color calibration of display devices, according to one implementation. With respect to the actions described in FIG. 5, it is noted that certain details and features have been left out of flowchart 560 in order not to obscure the discussion of the inventive features in the present application.

Referring to FIG. 5 in combination with FIGS. 1, 2, 3 and 4 (collectively hereinafter "FIGS. 1-5"), flowchart 560 includes receiving user selection data 142 identifying a color standard (action 561). Referring to FIGS. 1 and 2, in some implementations, user selection data 142 may be received, in action 561, by computing platform 102/202 of system 100/200, via communication network 108 and network communication links 118/218, from user system 120/220. In those implementations, user selection data 142 may be received in action 561 by software code 110, executed by hardware processor 104 of computing platform 102/202.

However, referring to FIGS. 1, 3 and 4, in other implementations, user selection data 142 may be received, in action 561, as one or more inputs to user system computing platform 322/422 by user 134, via UI 312/412 and input device(s) 332 of user system 320. In those implementations, user selection data 142 may be received in action 561 by software code 310, executed by hardware processor 324 of user system computing platform 322/422. As noted above, color standards selectable by user 114 using user selection data 142 may include industry standards such as any of Rec.709, Rec.601, Rec.2020, Rec.2100, or sRGB, for example. Alternatively, as further noted above, in use cases in which multiple display devices are being calibrated, the color standard selected by user 114 may be specific to those display devices, for example a range of colors common to those display devices, thereby ensuring those display devices appear consistent while optimizing for the unique characteristics of each display device. Moreover, and as also noted above, in some implementations, brightness readings may be used to calibrate display devices not just by color, but also by total light output, which may impact overall visual continuity.

Continuing to refer to FIGS. 1-5 in combination, flowchart 560 further includes receiving first display device selection data **144*a* identifying a first display device (hereinafter "first display device 140*a*/240*a*" or "first display device 440*a*") of display device(s) 140*a*/140*b*/140*c*/240*a*/240*b*/240*c*/440*a*/440*b*/440*c*440*c* (action 562). As noted above, display device(s) 140*a*/140*b*/140*c*/240*a*/240*b*/240*c*/440*a*/440*b*/440*c*** may take the form of any of a variety of display device types. As further noted above, examples of such display device types include projection devices such as video and still image projectors, display screens such as monitors, and display panels of a light wall, such as an LED panel of an LED light wall, to name a few.

It is noted that although flowchart 560 depicts action 561 as preceding action 562, that representation is merely exemplary. In various use cases, action 561 may precede action 562, as shown in FIG. 5, may follow action 562, or may be performed contemporaneously with action 562.

Referring to FIGS. 1 and 2, in some implementations, first display device selection data **144*a* may be received, in action 562, by computing platform 102/202 of system 100/200, via communication network 108 and network communication links 118/218, from user system 120/220. In those implementations, first display device selection data 144*a* may be received in action 562 by software code 110, executed by hardware processor 104 of computing platform 102/202**.

However, referring to FIGS. 1, 3 and 4, in other implementations, first display device selection data **144*a* may be received, in action 562, as one or more inputs to user system computing platform 322/422 by user 134, via UI 312/412 and input device(s) 332 of user system 320. In those implementations, first display device selection data 144*a* may be received in action 562 by software code 310, executed by hardware processor 324 of user system computing platform 322/422**.

Continuing to refer to FIGS. 1-5 in combination, flowchart 560 further includes calibrating, using calibration device 130/230/330/430, first display device **140*a*/240*a* or first display device 440*a* to the color standard identified by user selection data 142 (action 563). Calibration of display device(s) 140*a*/140*b*/140*c*/240*a*/240*b*/240*c*/440*a*/440*b*/440*c*** includes generating a series of known colors using the display device, measuring the output of the display when attempting to show each of those colors, and then applying calculations based on the color space of the selected color standard to adjust the light output from the display device so that the generated colors match their color standard reference values. By way of example: The display of a certain color of green on one display device may appear "blue-ish" by reference to a selected color standard. After measuring the offset from the desired level of "green-ness," the display device settings can be adjusted so that sending the same image data for that color green produces a "green-er" image.

Referring to FIGS. 1 and 2, in some implementations, software code 110 may be executed by hardware processor 104 of computing platform 102/202 to calibrate first display device **140*a*/240*a*, in action 563, based on first calibration data 146*a* collected using calibration device 130/230 in the form of a colorimeter or a spectroradiometer, for example, to conform first display device 140***a*/240*a* to the color standard identified by user selection data 142.

However, referring to FIGS. 1, 3 and 4, in other implementations, user 114 ensures that calibration device 330/430, e.g., colorimeter 430, is aimed at projection surface 452 and uses calibration device 330/430 to collect calibration data for first display device 440*a*. Software code 310 may then be executed by hardware processor 324 of user system computing platform 322/422 to calibrate first display device 440*a*, in action 563, using wireless communication link 454 with first display device 440*a*, based on the calibration data for first display device 440*a* collected using calibration device 330/420, to conform first display device 440*a* to the color standard identified by user selection data 142.

It is noted that, display device(s) 140*a*/140*b*/140*c*/240*a*/240*b*/240*c*/440*a*/440*b*/440*c* may include respective pre-loaded test patterns for use in color calibration. In use cases in which first display device 140*a*/240*a* or first display device 440*a* includes such pre-loaded test patterns, calibration of first display device 140*a*/240*a* or first display device 440*a* in action 563 may include automatically cycling through those test patterns for each color that first display device 140*a*/240*a* or first display device 440*a* is to be calibrated to.

In some implementations, the method outlined by flowchart 560 may conclude with action 563 described above. However, in implementations in which multiple display devices are being color calibrated, the method outlined by flowchart 560 may further include receiving second display device selection data 144*b* identifying a second display device (hereinafter "second display device 140*b*/240*b*" or "second display device 440*b*") of display device(s) 140*a*/140*b*/140*c*/240*a*/240*b*/240*c*/440*a*/440*b*/440*c* (action 564). As noted above, in various use cases, display device(s) 140*a*/140*b*/140*c*/240*a*/240*b*/240*c*/440*a*/440*b*/440*c* may take the form of any of a variety of display device types. As further noted above, examples of such display device types include projection devices such as video and still image projectors, display screens such as monitors, and display panels of a light wall, such as an LED panel of an LED light wall, to name a few.

Referring to FIGS. 1 and 2, in some implementations, second display device selection data 144*b* may be received, in action 564, by computing platform 102/202 of system 100/200, via communication network 108 and network communication links 118/218, from user system 120/220. In those implementations, second display device selection data 144*b* may be received in action 562 by software code 110, executed by hardware processor 104 of computing platform 102/202.

However, referring to FIGS. 1, 3 and 4, in other implementations, second display device selection data 144*b* may be received, in action 564, as one or more inputs to user system computing platform 322/422 by user 134, via UI 312/412 and input device(s) 332 of user system 320. In those implementations, second display device selection data 144*b* may be received in action 564 by software code 310, executed by hardware processor 324 of user system computing platform 322/422.

Continuing to refer to FIGS. 1-5 in combination, in some implementations flowchart 560 may further include calibrating second display device 140*b*/240*b* or second display device 440*b* to the color standard identified by user selection data 142 (action 565). Referring to FIGS. 1 and 2, in some implementations, software code 110 may be executed by hardware processor 104 of computing platform 102/202 to calibrate second display device 140*b*/240*b*, in action 565, based on second calibration data 146*b* collected using calibration device 130/230 in the form of a colorimeter or a spectroradiometer, for example, to conform to the color standard identified by user selection data 142.

Software code 310 may then be executed by hardware processor 324 of user system computing platform 322/422 to calibrate second display device 440*b*, in action 565, using wireless communication link 454, based on the calibration data for second display device 440*b* collected using calibration device 330/420, to conform to the color standard identified by user selection data 142.

As noted above, display device(s) 140*a*/140*b*/140*c*/240*a*/240*b*/240*c*/440*a*/440*b*/440*c* may include respective pre-loaded test patterns for use in color calibration. In use cases in which second display device 140*b*/240*b* or second display device 440*b* includes such pre-loaded test patterns, calibration of second display device 140*b*/240*b* or second display device 440*b* in action 565 may include automatically cycling through those test patterns for each color that second display device 140*b*/240*b* or second display device 440*b* is to be calibrated to.

Calibration of first display device 140*a*/240*a* or first display device 440*a* to the color standard identified by user selection data 142, in action 563, accurately conforms first display device 140*a*/240*a* or first display device 440*a* to that identified color standard. Moreover, calibration of second display device 140*b*/240*b* or second display device 440*b* to the color standard identified by user selection data 142, in action 565, accurately conforms second display device 140*b*/240*b* or second display device 440*b* to that identified color standard. Consequently, in some implementations the method outlined by flowchart 560 advantageously results in both of first display device 140*a*/240*a* or first display device 440*a* and second display device 140*b*/240*b* or second display device 440*b* being accurately conformed to the same color standard. It is noted that actions analogous to actions 562 and 563, or to actions 564 and 565 may be performed iteratively for a third display device, e.g., display device 140*c*/240*c*/440*c*, a fourth display device, and so forth, until any desired number of display devices are color calibrated to accurately conform to the same color standard.

Thus, the present application discloses an automated color calibration solution for display devices that addresses and overcomes the drawbacks and deficiencies in the conventional art. The novel and inventive systems and methods disclosed in the present application advance the state-of-the-art by introducing a color calibration solution that automates calibration value capture for multiple colors and tunes the settings of the display device using those calibration values in a process that enables color calibrating multiple display devices together so as to accurately conform to the same color standard. In the specific use case of color calibrating five projectors to the same color standard, for example, in contrast to the conventional procedure requiring up to two hours to be performed, the automated color calibration solution disclosed in the present application can be completed in as little as five to fifteen minutes.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:

a computing platform having a hardware processor and a system memory storing a software code; and a calibration device and one or more display devices each communicatively coupled to the computing platform;

the hardware processor configured to execute the software code to:

receive user selection data identifying a color standard;

receive first display device selection data identifying a first display device of the one or more display devices; and calibrate, using the calibration device, the first display device to conform the first display device to the color standard;

wherein the computing platform is remote from the calibration device and the one or more display devices.

2. The system of claim 1, wherein the one or more display devices comprise one or more projectors, one or more display screens, or one or more display panels of a same light wall.

3. The system of claim 1, wherein the calibration device comprises a colorimeter or a spectroradiometer.

4. The system of claim 1, wherein the color standard is one of Rec.709, Rec.601, Rec.2020, Rec.2100, or sRGB.

5. The system of claim 1, wherein the calibration device is a peripheral device of the computing platform, and wherein the computing platform is communicatively coupled to each of the one or more display devices via a respective wireless connection.

6. The system of claim 5, wherein the calibration device is communicatively coupled to the computing platform via a wired connection.

7. The system of claim 1, further comprising a user system including the calibration device as a peripheral device of the user system, wherein the calibration device is communicatively coupled to the computing platform via the user system.

8. The system of claim 7, wherein the computing platform comprises a web server configured to present a web browser based user interface on a display of the user system.

9. The system of claim 8, wherein the computing platform and the calibration device are portable.

10. A method for use by a system including a computing platform having a hardware processor and a system memory storing a software code, and a calibration device, a first display device, and a second display device each communicatively coupled to the computing platform, the method comprising:

receiving, by the software code executed by the hardware processor, user selection data identifying a color standard;

receiving, by the software code executed by the hardware processor, first display device selection data identifying the first display device;

calibrating, by the software code executed by the hardware processor using the calibration device, the first display device to conform the first display device to the color standard;

receiving, by the software code executed by the hardware processor, second display device selection data identifying the second display device; and calibrating, by the software code executed by the hardware processor using the calibration device, the second display device to conform the second display device to the color standard.

11. The method of claim 10, wherein the color standard is a range of colors common to the first display device and the second display device.

12. The method of claim 10, wherein the first display device comprises a projector, a display screen, or a display panel of a same light wall.

13. The method of claim 10, wherein the calibration device comprises a colorimeter or a spectroradiometer.

14. The method of claim 10, wherein the color standard is one of Rec.709, Rec.601, Rec.2020, Rec.2100, or sRGB.

15. The method of claim 10, wherein the calibration device is remote from the first display device.

16. A computer-readable non-transitory storage medium having stored thereon a software code, which when executed by a hardware processor, instantiates a method comprising:

receiving user selection data identifying a color standard;

receiving first display device selection data identifying a first display device;

calibrating, using a calibration device, the first display device to conform the first display device to the color standard;

receiving second display device selection data identifying a second display device; and calibrating, using the calibration device, the second display device to conform the second display device to the color standard.

17. The computer-readable non-transitory storage medium of claim 16, wherein the first display device comprises a projector, a display screen, or a display panel of a same light wall.

18. The computer-readable non-transitory storage medium of claim 16, wherein the calibration device comprises a colorimeter or a spectroradiometer.

19. The computer-readable non-transitory storage medium of claim 16, wherein the color standard is one of Rec.709, Rec.601, Rec.2020, Rec.2100, or sRGB.

20. The computer-readable non-transitory storage medium of claim 16, wherein the calibration device is remote from the first display device.

* * * * *